(12) United States Patent
Kim

(10) Patent No.: US 6,393,307 B1
(45) Date of Patent: May 21, 2002

(54) METHOD FOR DISPLAYING STATUS OF RADIO TERMINAL

(75) Inventor: Hoo-Ja Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/371,724

(22) Filed: Aug. 10, 1999

(30) Foreign Application Priority Data

Aug. 10, 1998 (KR) .............................................. 98-32434

(51) Int. Cl.[7] .................................................. H04B 1/38
(52) U.S. Cl. .................... 455/566; 455/67.7; 455/226.4; D14/138; D14/339
(58) Field of Search ................................ 455/566, 425, 455/575, 90, 145, 154, 158.4, 158.5, 226.4, 67.7; D14/339, 130, 137, 138

(56) References Cited

U.S. PATENT DOCUMENTS

| | | | | |
|---|---|---|---|---|
| 5,381,460 A | * | 1/1995 | Ohashi et al. ................. | 379/58 |
| 5,737,394 A | * | 4/1998 | Anderson et al. .............. | 379/88 |
| 5,758,295 A | * | 5/1998 | Ahlberg et al. .............. | 455/566 |
| 5,802,468 A | * | 9/1998 | Gallant et al. ............... | 455/422 |
| 5,848,356 A | * | 12/1998 | Jambhekar et al. .......... | 455/403 |
| 5,903,832 A | * | 5/1999 | Seppanen et al. ............ | 455/414 |
| 5,914,668 A | * | 6/1999 | Chavez, Jr. et al. ..... | 340/825.44 |
| 6,035,183 A | * | 3/2000 | Todd et al. ............... | 455/226.2 |
| 6,047,197 A | * | 4/2000 | Jarrad ......................... | 455/566 |
| 6,091,716 A | * | 7/2000 | Gorday et al. ............... | 370/314 |

* cited by examiner

Primary Examiner—William Trost
Assistant Examiner—Congvan Tran
(74) Attorney, Agent, or Firm—Dilworth & Barrese, LLP

(57) ABSTRACT

A method for displaying the status of a radio terminal during initialization, incoming calls, and outgoing calls, by using icons so as to be easily recognized by a user. The method includes the steps of displaying related icons; shifting a movable icon or an activity icon; checking whether a condition is met; if a condition is met, displaying an idle status; and if the condition is not met, returning to the step of shifting the movable icon or shifting the activity icon, whichever corresponds to the status of the radio terminal.

12 Claims, 7 Drawing Sheets

METHOD FOR DISPLAYING STATUS OF RADIO TERMINAL

CLAIM OF PRIORITY

This application makes reference to, incorporates the same herein, and claims all benefits accruing under 35 U.S.C. §119 from an application entitled METHOD FOR DISPLAYING STATUS OF RADIO TERMINAL earlier filed in the Korean Industrial Property Office on Aug. 10, 1998, and there duly assigned Serial No. 98-32434.

BACKGROUND OF THE INVENTION

1. Field of the Invention

The present invention relates to a method for informing a user of the status of a radio terminal, and more particularly, to a method for displaying the status of a radio terminal using icons so as to be easily recognized by a user.

2. Description of the Related Art

A short phrase or sentence has generally been used to inform a user of the status of a radio terminal. Even where the phrase or sentence can be read quickly, the user is still required to carefully watch a display screen on the radio terminal in order to ascertain the status of the terminal. In a cellular phone for example, current status is communicated via displayed icons or character data. For example, an icon representing non-service is displayed or a symbol 'X' is superimposed on an icon representing a phone. However, as terminals become more compact, their display screens become smaller making it difficult to read and easily ascertain terminal status.

SUMMARY OF THE INVENTION

It is therefore an object of the present invention to provide a method for displaying an initialization process of a radio terminal which is easily readable and ascertainable by the user.

It is another object of the present invention to provide a method for displaying an incoming call status of a radio terminal which is easily readable and ascertainable by the user.

It is still another object of the present invention to provide a method for displaying an originating call status of a radio terminal which is easily readable and ascertainable by the user.

In accordance with one aspect of the present invention, a method for displaying the status of a radio terminal having a memory which stores a radio terminal icon, a base station antenna icon, and a movable icon, is provided which includes the steps of: displaying the radio terminal icon and the station antenna icon when an RSSI (Received Signal Strength Indication) value is less than a threshold value needed to make a call; shifting the movable icon away from the radio terminal icon in the direction of the base station antenna icon; checking whether the RSSI value is equal to or greater than the threshold value; if the RSSI (Received Signal Strength Indication) value is equal to or greater than the threshold value, displaying an idle status; and if the RSSI value is less than the threshold value, returning to the step of shifting the movable icon.

In accordance with another aspect of the present invention, a method for displaying the status of a radio terminal having a memory which stores a radio terminal icon and activity icons, is provided which includes the steps of: checking whether a call signal is received; if a call signal is received, displaying the radio terminal icon; and displaying the activity icons in increasing numbers, consecutively flashing in the direction pointing away from the outer sides of the radio terminal icon.

In accordance with still another aspect of the present invention, a method for displaying the status of a radio terminal having a memory which stores a radio terminal icon, a phone icon, a handset icon and a movable icon, is provided which includes the steps of: checking whether a send key for originating a call is pressed; if the send key is pressed, displaying the radio terminal icon, phone icon, and handset icon; and shifting the movable icon away from the radio terminal icon in the direction of the phone icon.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well known constructions or functions are not described in detail so as not to obscure the present invention.

Figure 1:
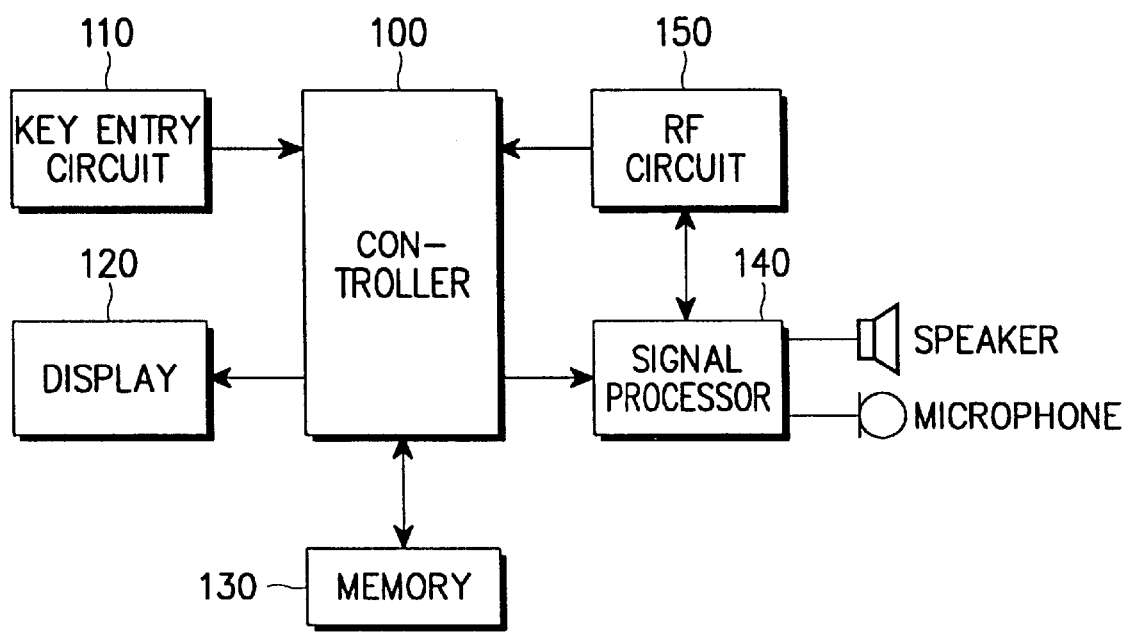
FIG. 1 is a block diagram of a radio terminal to which the present invention is applicable.

Referring to FIG. 1, a controller 100 controls the overall operation of a radio terminal. A memory 130 consists of a read only memory (ROM) for storing an operating program, an electrically erasable and programmable read only memory (EEPROM), and a random access memory (RAM). The memory 130 stores icon data. A display 120, a liquid crystal display (LCD) for example, displays the status of the radio terminal or a program procedure under the control of the controller 100. A key entry circuit 110 includes a plurality of numeric and function keys and transmits key data externally generated by a key input to the controller 100. A radio frequency (RF) circuit 150, under the control of the controller 100, transmits a signal generated from the controller 100 to a base station and converts an RF signal received through an antenna into a corresponding signal. A signal processor 140 modulates a voice signal received from a microphone into voice data and demodulates voice data received from the RF circuit 150 into a voice signal to be generated through a speaker.

Figure 2A:
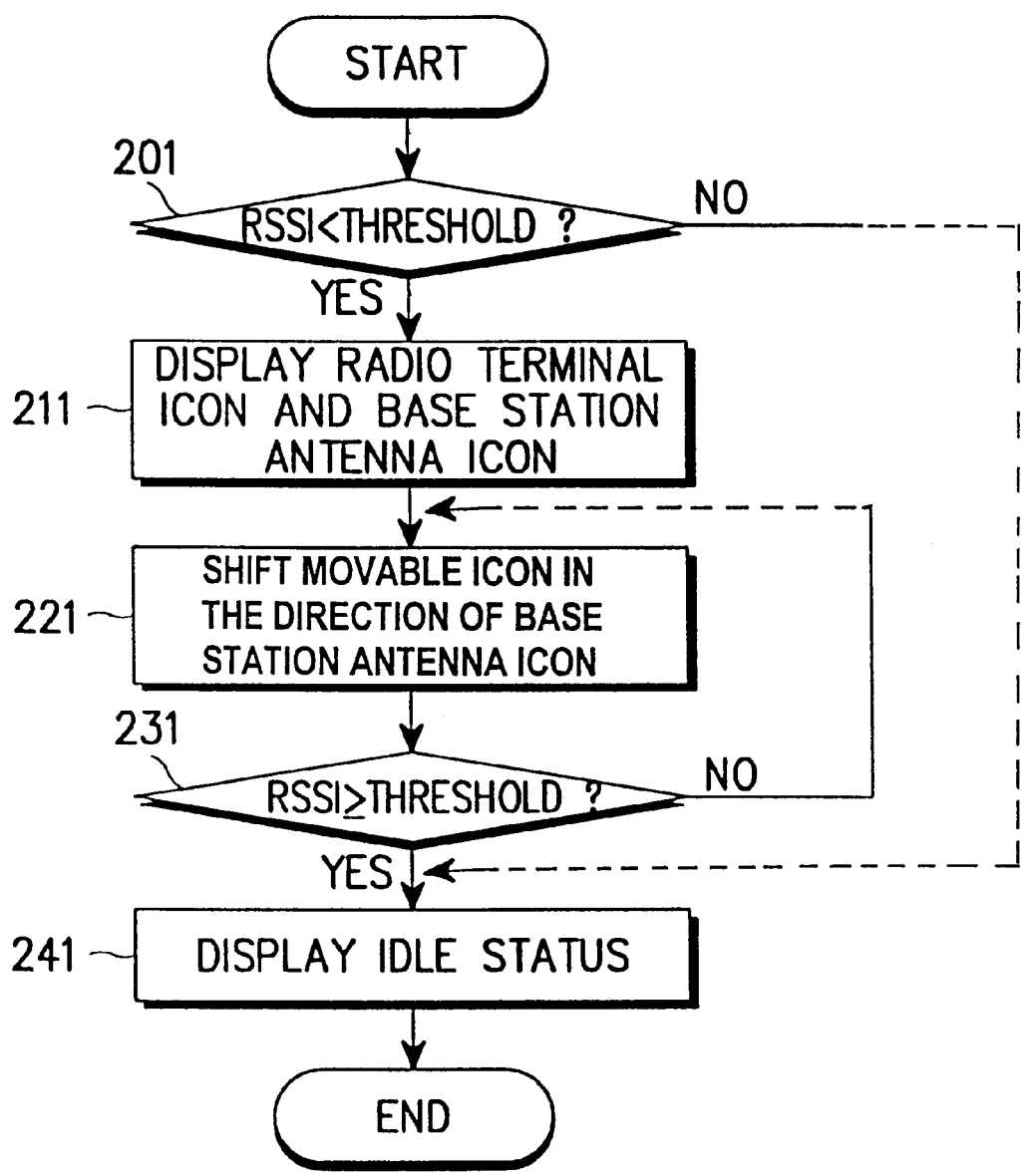
FIG. 2A is a flow chart for illustrating an initialization process of a radio terminal using icons in accordance with the present invention.
Figure 3A:
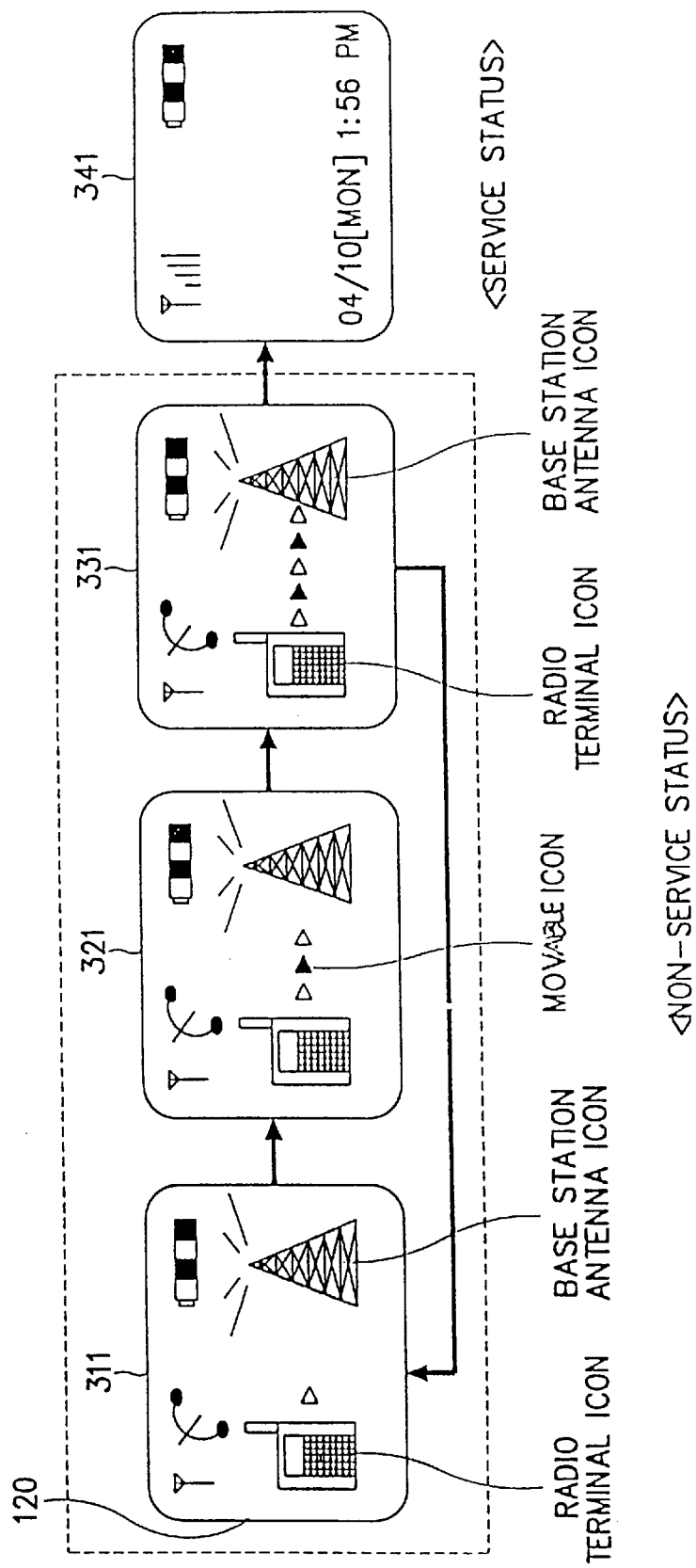
FIG. 3A is a diagram of the display screen of a radio terminal displaying an initialization process the a radio terminal using icons in accordance with the present invention.

FIG. 2A is a flow chart illustrating an initialization process of a radio terminal utilizing icons. FIG. 3A is a diagram pictorially representing the related icons of the initialization process of FIG. 2A as shown on the display 120.

Referring to both FIGS. 2A and 3A, the controller 100 checks at step 201 whether an RSSI (Received Signal Strength Indication) value is less than a threshold value necessary to make a call. If the RSSI value is equal to or greater than the threshold value, then it is possible to make a call, and an idle status of the radio terminal is displayed at step 241 on a screen 341 as shown in FIG. 3A. If it is less than the threshold value, the controller 100 retrieves, at step 211, a radio terminal icon and a base station antenna icon stored in the memory 130, and displays them on screen 311 of display 120 as shown in FIG. 3A. At step 221, a movable icon is shifted in the direction of the base station antenna icon from the radio terminal icon as displayed on screens 321 and 331, as is indicated in FIG. 3A. At step 231, the controller 100 checks again whether it is possible to make a call by determining if the RSSI value is equal to or greater than the threshold value. If the RSSI value is less than the threshold value, the process returns to step 221 and continues to display the movable icon. If the RSSI value is equal to or greater than a threshold value, then it is possible to make a call, and at step 241 an idle status of the radio terminal is displayed on a screen 341 as shown in FIG. 3A.

Figure 2B:
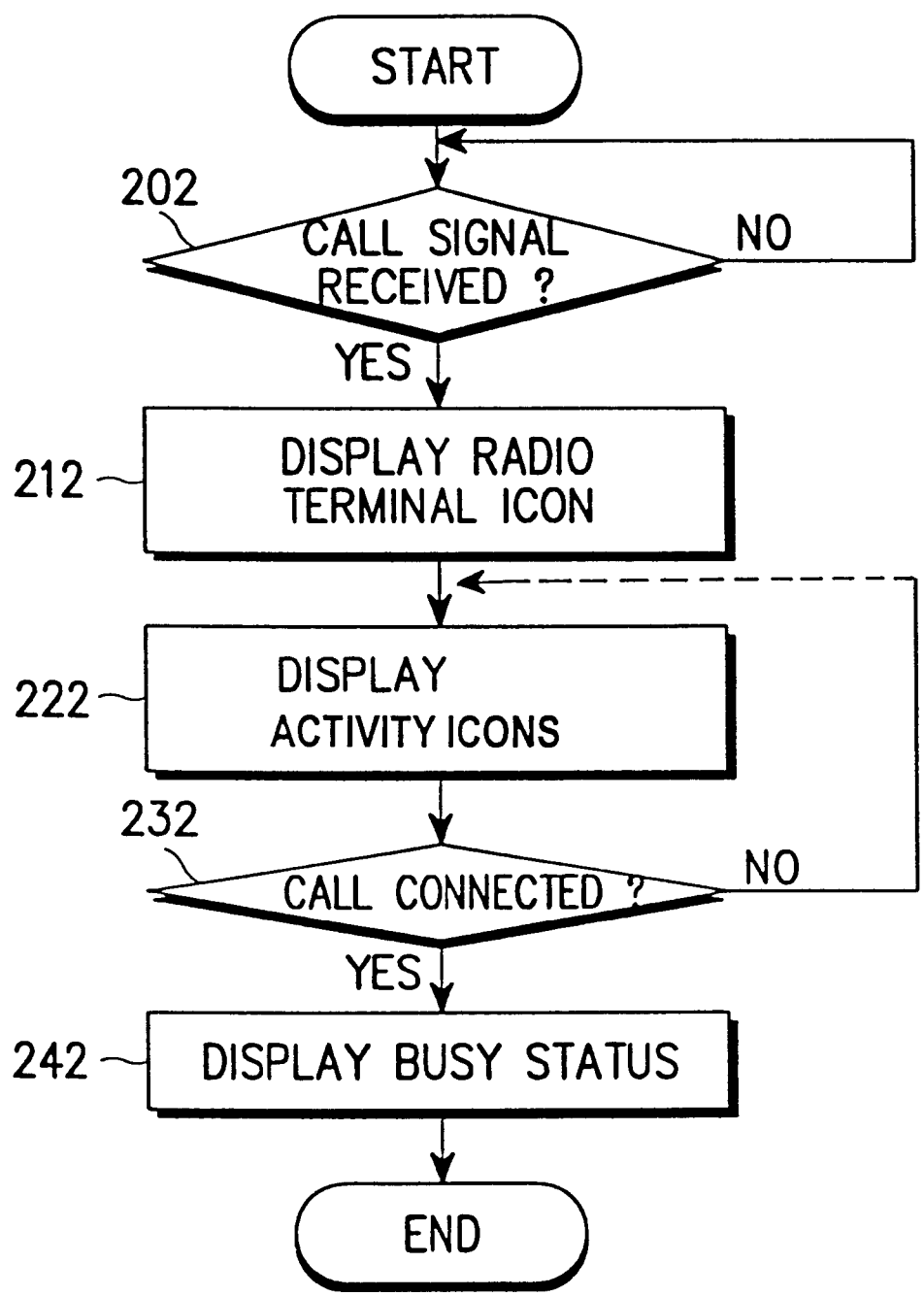
FIG. 2B is a flow chart for illustrating a call incoming status of a radio terminal using icons in accordance with the present invention.
Figure 3B:
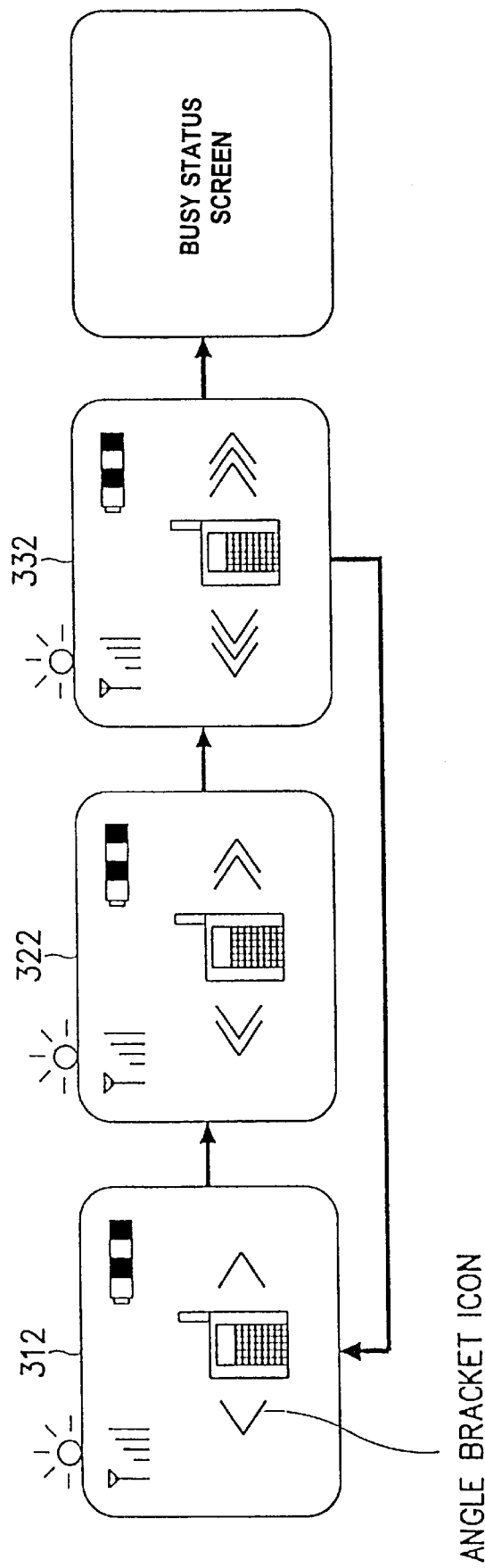
FIG. 3B is a diagram of the display screen of a radio terminal displaying a call incoming status of the radio terminal using icons in accordance with the present invention.

FIG. 2B is a flow chart illustrating a call incoming status of a radio terminal utilizing icons. FIG. 3B is a diagram pictorially representing the related icons of the call incoming status of FIG. 2B as shown on the display 120.

Referring to FIGS. 2B and 3B, the controller 100 checks whether a call signal is received at step 202. If it is received, the controller 100 retrieves the radio terminal icon from the memory 130 at step 212 to display it on screen 312 using the display 120 as shown in FIG. 3B. At step 222, activity icons, preferably angle bracket icons such as "<" and ">", are displayed in increasing numbers in the direction pointing away from the outer sides of the radio terminal icon on screens 322 and 332, as shown in FIG. 3B. Other icons such as parentheses, quotation marks, apostrophes, and the like, for example, may also be used instead of the angle bracket icons. The controller 100 then determines, at step 232, if a call is connected by checking whether the user answers the call. If the call is not connected, the process returns to step 222 to continue to display the movable activity icons restarting at screen 312. If the call is connected, the process is followed by step 242 to display a busy status.

Figure 2C:
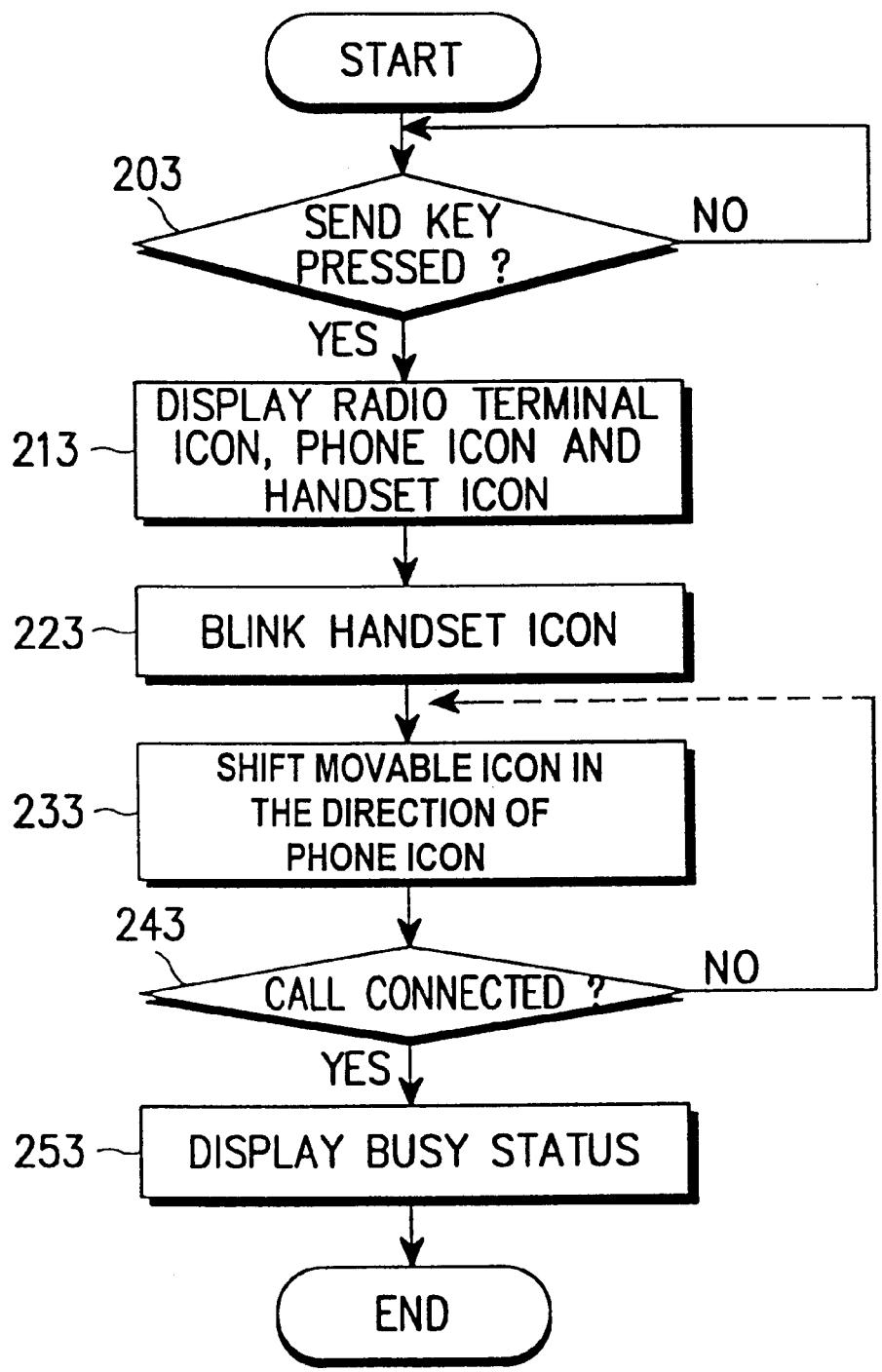
FIG. 2C is a flow chart for illustrating a call originating status of a radio terminal using icons in accordance with the present invention.
Figure 3C:
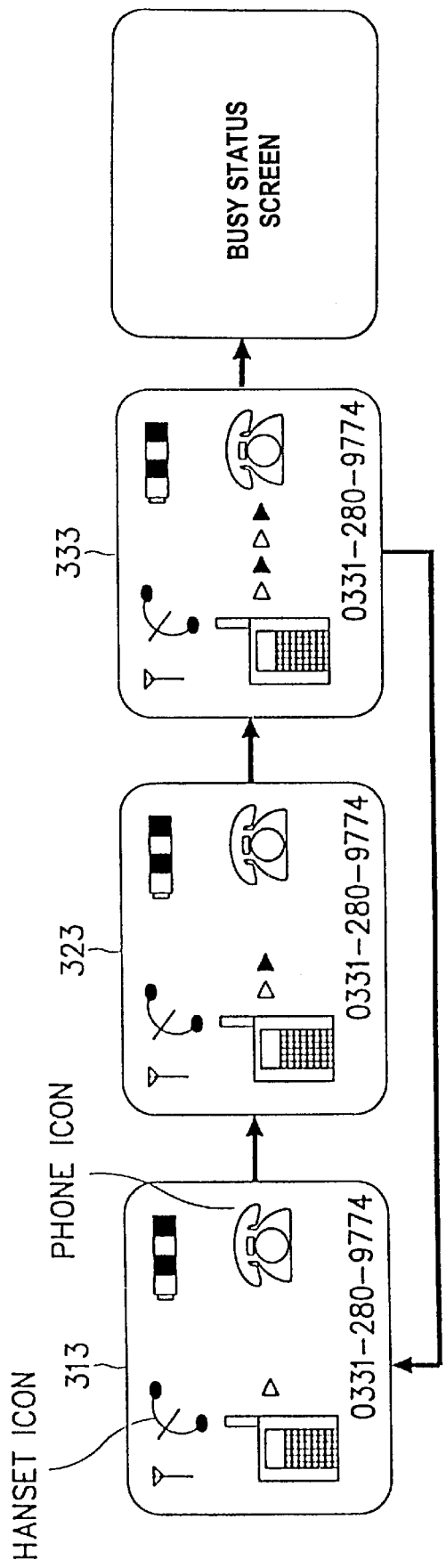
FIG. 3C is a diagram of the display screen of a radio terminal displaying a call originating status of the radio terminal using icons in accordance with the present invention.

FIG. 2C is a flow chart illustrating a call originating status of a radio terminal utilizing icons. FIG. 3C is a diagram pictorially representing the related icons of the call originating status as shown on the display 120.

At step 203, the controller 100 checks whether a send key for originating a call is pressed. If a send key is pressed, data is provided to the controller 100 via the key entry circuit 110, the controller 100 then retrieves the radio terminal icon, a phone icon and a handset icon from the memory 130 and displays them, at step 213, on screen 313 of the display 120.

At step 223, the handset icon is blinked. At step 233, the movable icon is shifted in the direction of the phone icon from the radio terminal icon as shown on screen 323 and 333. The controller 100 determines at step 243 if the call is connected by checking whether a called party answers the call. If the call is not connected, the process returns to step 233 and continues to display the movable icon. If the call is connected, a busy status is displayed at step 253. The above call originating process is displayed on screens 313, 323 and 333 as shown in FIG. 3C.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A method for displaying the status of a process of establishing a communication link with a base station of a radio terminal having a memory storing at least a radio terminal icon, a base station antenna icon and a movable icon, said method comprising the steps of:

displaying said radio terminal icon and said base station antenna icon when a received signal strength indication (RSSI) value is less than a threshold value; and shifting said movable icon in the direction of said base station antenna icon from said radio terminal icon during said establishing process.

2. The method recited in claim 1, further comprising the steps of:

determining whether said RSSI value is equal to or greater than said threshold value;

if said RSSI value is equal to or greater than said threshold value, displaying an idle status; and if said RSSI value is less than said threshold value, returning to said step of shifting said movable icon.

3. A method for displaying the status of a process of establishing a communication link with a base station of a radio terminal having a memory storing a radio terminal icon and activity icons, said method comprising the steps of:

determining whether a call signal is received;

if the call signal is received, displaying said radio terminal icon; and displaying said activity icons in increasing numbers in a direction moving away from at least one side edge of said radio terminal icon during said establishing process.

4. The method as recited in claim 3, further comprising the steps of:

determining whether a call is connected by checking if a user answers said call;

if said call is connected, displaying a busy status; and if said call is not connected, returning to said step of displaying said activity icons.

5. The method as recited in claim 3, wherein said activity icons are angle brackets.

6. The method as recited in claim 3, wherein said activity icons are selected from the group consisting of parentheses, quotation marks, and apostrophes.

7. A method for displaying the status of a process of establishing a communication link with a base station of a radio terminal having a memory storing at least a radio terminal icon, a phone icon, a handset icon and a movable icon, said method comprising the steps of:

determining whether a send key for originating a call is pressed;

if the send key is pressed, displaying said radio terminal icon, phone icon and handset icon; and shifting said movable icon in the direction of said phone icon from said radio terminal icon during said establishing process.

8. The method as recited in claim 7, further comprising the steps of:

determining whether a call is connected by checking whether a called party answers said call;

if said call is connected, displaying a busy status; and if said call is not connected, returning to said step of shifting said movable icon.

9. The method as recited in claim 7, further comprising the step of blinking said handset icon before shifting said movable icon.

10. The method as recited in claim 8, further comprising the step of blinking said handset icon before shifting said movable icon.

11. A method for displaying the status of a process of establishing a communication link with a base station of a radio terminal having a memory storing at least a first icon, a second icon spaced from said first icon and a third icon movable from said first icon to said second icon, said method comprising the steps of:

displaying said first icon and said second icon when a received signal strength indication (RSSI) value is less than a threshold value; and shifting said third icon in the direction of said second icon from said first icon during said establishing process.

12. The method recited in claim 11, further comprising the steps of:

determining whether said RSSI value is equal to or greater than said threshold value;

if said RSSI value is equal to or greater than said threshold value, displaying an idle status; and if said RSSI value is less than said threshold value, returning to said step of shifting said third icon.

* * * * *